(12) United States Patent
Wei et al.

(10) Patent No.: US 10,275,062 B2
(45) Date of Patent: Apr. 30, 2019

(54) FLEXIBLE ELECTRONIC DEVICE HAVING BARRIER PLANARIZATION LAYER INCLUDING NITROGEN-RICH REGION AND OXYGEN-RICH REGION

(71) Applicant: Industrial Technology Research Institute, Hsinchu (TW)

(72) Inventors: Hsiao-Fen Wei, New Taipei (TW); Kun-Lin Chuang, Hsinchu (TW); Chao-Jen Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/591,120

(22) Filed: May 10, 2017

(65) Prior Publication Data

US 2018/0107313 A1 Apr. 19, 2018

Related U.S. Application Data (60) Provisional application No. 62/408,081, filed on Oct. 14, 2016.

(30) Foreign Application Priority Data

Dec. 30, 2016 (TW) .............................. 105144021 U (51) Int. Cl.
*G06F 3/041* (2006.01)
*G06F 3/044* (2006.01)
(Continued)

(52) U.S. Cl.
CPC .............. *G06F 3/0412* (2013.01); *B32B 7/12* (2013.01); *B32B 37/025* (2013.01);
(Continued)

(58) Field of Classification Search
CPC ......... G06F 3/0412; G06F 2203/04102; B32B 37/025; B32B 7/12; B32B 2457/208; B32B 2255/26; B32B 2363/00
See application file for complete search history.

(56) References Cited

U.S. PATENT DOCUMENTS

| | | |
|---|---|---|
| 6,522,067 B1 | 2/2003 | Graff et al. |
| 6,949,389 B2 | 9/2005 | Pichler et al. |

(Continued)

FOREIGN PATENT DOCUMENTS

| | | |
|---|---|---|
| CN | 103579256 | 2/2014 |
| CN | 105835464 | 8/2016 |

(Continued)

OTHER PUBLICATIONS

Sang-Hee Ko Park et al.,"Ultra Thin Film Encapsulation of Organic Light Emitting Diode on a Plastic Substrate", ETRI Journal, vol. 27, No. 5, Oct. 2005,pp. 545-550.

(Continued)

*Primary Examiner* — Ryan A Lubit
(74) *Attorney, Agent, or Firm* — JCIPRNET (57) ABSTRACT

According an embodiment of the disclosure, a flexible electronic device is provided. The flexible electronic device may include a flexible substrate, a device layer, and a barrier planarization layer. The device layer is located on the flexible substrate and has an upper surface. The upper surface has a maximum height difference less than or equal to 900 nm in a film stacking direction. The barrier planarization layer covers the device layer and the flexible substrate and has a covering surface and a planarization surface opposite to the covering surface. The barrier planarization layer has a water vapor transmission rate lower than or equal to $10^{-2}$ g/m²-day.

15 Claims, 5 Drawing Sheets

(51) Int. Cl.
  *G06F 1/16*  (2006.01)
  *B32B 7/12*  (2006.01)
  *B32B 37/00* (2006.01)

(52) U.S. Cl.
  CPC ............ *G06F 1/1652* (2013.01); *G06F 3/044* (2013.01); *B32B 2255/26* (2013.01); *B32B 2363/00* (2013.01); *B32B 2457/208* (2013.01); *G06F 2203/04102* (2013.01); *G06F 2203/04103* (2013.01)

(56) References Cited

U.S. PATENT DOCUMENTS

| | | | |
|---|---|---|---|
| 7,030,557 B2 | 4/2006 | Su et al. | |
| 7,229,703 B2 | 6/2007 | Kawashima et al. | |
| 7,341,766 B2 | 3/2008 | Kishimoto et al. | |
| 9,399,336 B2 | 7/2016 | Chan et al. | |
| 2014/0030494 A1 | 1/2014 | Chan et al. | |
| 2015/0064429 A1* | 3/2015 | Iwaya ................. | B32B 7/12 428/213 |
| 2015/0258767 A1* | 9/2015 | Asakawa ............ | B32B 43/006 156/718 |
| 2016/0120029 A1* | 4/2016 | Murashige .......... | B32B 17/064 174/254 |
| 2016/0172188 A1* | 6/2016 | Lim .................... | H01L 21/02164 423/335 |
| 2017/0177148 A1* | 6/2017 | Lee ..................... | G06F 3/044 |
| 2017/0351365 A1* | 12/2017 | Sasaki ................ | G06F 3/0412 |

FOREIGN PATENT DOCUMENTS

| | | |
|---|---|---|
| TW | 201319297 | 5/2013 |
| TW | 201331407 | 8/2013 |
| TW | 201508911 | 3/2015 |
| TW | 201542691 | 11/2015 |
| TW | I550850 | 9/2016 |

OTHER PUBLICATIONS

Yun Cheol Han et al., "The encapsulation of an organic light-emitting diode using organic—inorganic hybrid materials and MgO", Organic Electronics,vol. 12, Issue 4, Apr. 2011, pp. 609-613.

Gi Heon Kim et al.,"Encapsulation of organic light-emitting devices by means of photopolymerized polyacrylate films", Polymer,vol. 45, Issue 6, Mar. 2004, pp. 1879-1883.

"Office Action of Taiwan Counterpart Application", dated Mar. 22, 2018, p. 1-p. 4, in which the listed references were cited.

* cited by examiner

(PEEK), and so forth, polyolefin, or other flexible organic materials. The inorganic material is, for example, metal, glass, or other inorganic materials with flexibility.

Figure 1A:
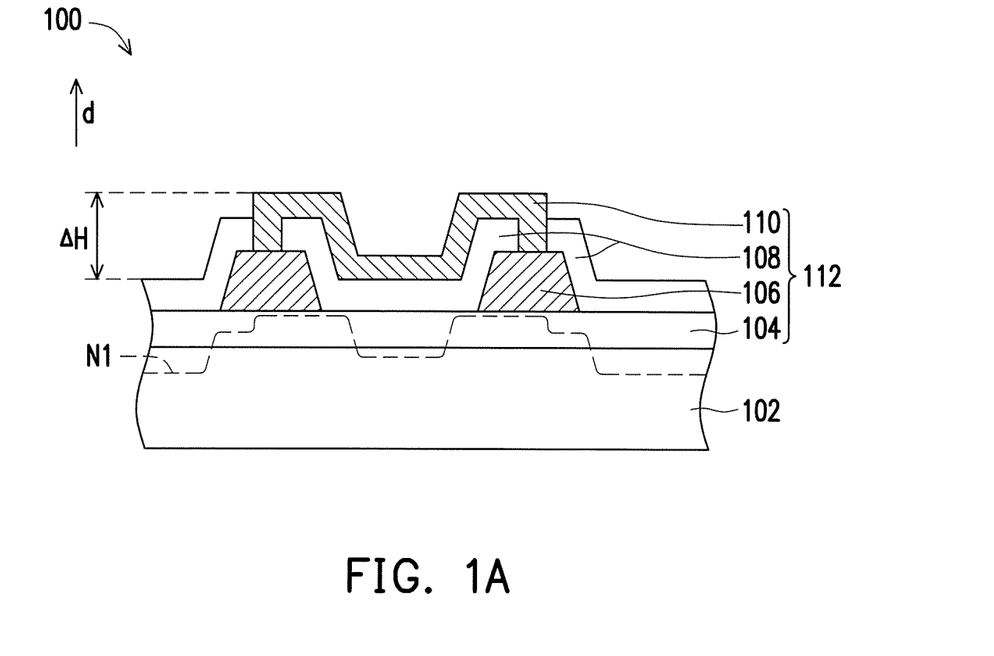

A buffer layer 104 may be selectively formed on the flexible substrate 102, and an upper surface of the flexible substrate 102 may be completely covered by the buffer layer 104. A material of the buffer layer 104 includes silicon nitride, silicon oxynitride, or a combination of the foregoing. But the disclosure is not limited thereto.

A conductive layer 106 may be formed on the buffer layer 104. The conductive layer 106 is formed by following steps. For example, a layer of a conductive material (not shown) is deposited, and the conductive material is patterned through a photolithographic and etching process to define a plurality of electrode patterns. A material of the conductive layer 106 may include indium tin oxide (ITO), indium zinc oxide (IZO), Al doped ZnO (AZO), Ga doped zinc oxide (GZO), zinc-tin oxide (ZTO), fluorine-doped tin oxide (FTO), indium(III) oxide ($In_2O_3$), zinc oxide (ZnO), tin dioxide ($SnO_2$), titanium dioxide ($TiO_2$), organic conductive polymer, or other transparent conductive materials. But the disclosure is not limited thereto.

An insulating layer 108 is formed on the conductive layer 106. The insulating layer 108 is formed by following steps. For example, after an insulating material layer (not shown) is formed through chemical vapor deposition (CVD), the insulating material layer is patterned through the photolithographic and etching process to form a plurality of openings exposing the conductive layer 106. Alternately, after the insulating material layer is formed through wet coating, the insulating material layer is patterned through the photolithographic and etching process to form a plurality of openings exposing the conductive layer 106. A material of the insulating layer 108 includes an insulating material containing ester group, for example, acrylic resin and so forth, or includes inorganic oxide, inorganic nitride, or inorganic nitrogen oxide, for example, silicon oxide, silicon nitride, or silicon oxynitride.

A metal layer 110 is formed on the insulating layer 108, and the metal layer 110 is formed by following steps. For example, a metal material is formed through deposition, and the metal material is patterned through the photolithographic and etching process to define a metal pattern. A portion of the insulating layer 108 may be covered by the metal layer 110, and the metal layer 110 is in contact with the conductive layer 106 through an opening of the insulating layer 108.

As shown in FIG. 1A, an embodiment provides that an upper surface of a device layer 112, along a film stacking direction d, has the maximum height difference ΔH, for example, less than or equal to 900 nm, less than or equal to 600 run preferably, or less than or equal to 300 nm more preferably. The device layer 112 formed on the flexible substrate 102 has a nonplanar film stacking structure, and an imaginary connecting line (i.e., a neutral axis) N1 with an internal stress of 0 in the film stacking direction d shows varying heights. Generally, a height $\bar{y}$ of the neutral axis N1 at a specific position in the film stacking direction d may be represented as (Equation 1):

$$\bar{y} = \frac{\sum L_i \cdot W_i \cdot H_i}{\sum L_i \cdot W_i} \quad \text{(Equation 1)}$$

$L_i$ represents a length of an equivalent structure of an i-th film layer at the specific position corresponding to a Young's modulus, $W_i$ represents a thickness of the i-th film layer at the specific position, and $H_i$ represents a height of the i-th film layer at the specific position at a center point in the film stacking direction.

According to a calculation result (of the Equation 1), at the specific position with a greater film stacking thickness, for example, a region with a pattern layer, the height $\bar{y}$ of the neutral axis N1 is greater. On the contrary, at the specific position with a smaller film stacking thickness, for example, a region without the pattern layer, the height $\bar{y}$ of the neutral axis N1 is lower. In other words, before the flexible electronic device 100 is planarized, differences of the height $\bar{y}$ of the neutral axis N1 are considerable. If the differences of the height $\bar{y}$ in parts of the neutral axis N1 are overly large, the device layer 112 may experience a failure more easily during a flexural process, for example, a failure of electrical properties or a failure of physical characteristics (e.g., barrier effects). Nevertheless, if a planarization layer is formed on the flexible substrate 102 and the device layer 112, the planarization leads to the reduction of the differences of the height $\bar{y}$ in parts of the neutral axis N1.

Figure 1B:
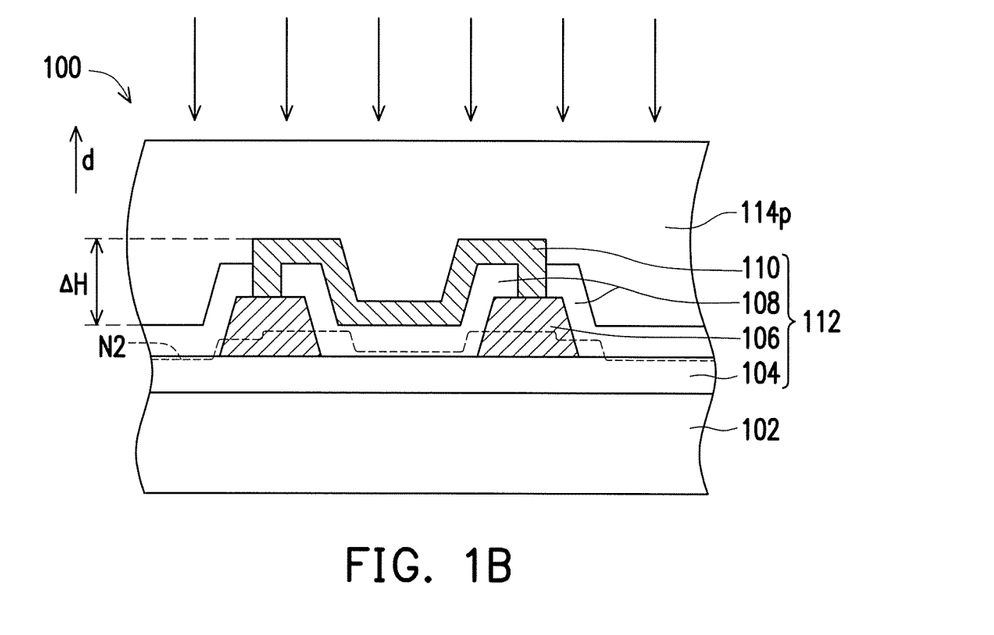

Referring to FIG. 1B, after the flexible substrate 102 and the device layer 112 are formed, a first barrier planarization structure 114p may be formed on the flexible substrate 102 and the device layer 112 through solution coating. A material of the first barrier planarization structure 114p, for example, includes polysilazane, polysiloxane, polysiloxazane, or other suitable materials. Along the film stacking direction d, if the upper surface of the device layer 112 has the maximum height difference ΔH, for example, less than or equal to 900 nm, less than or equal to 600 nm preferably, or less than or equal to 300 nm more preferably, the first barrier planarization structure 114p may be planarized. Afterwards, the first barrier planarization structure 114p undergoing the solution coating is solidified. Next, plasma-based ion implantation (PBII) is applied to the first barrier planarization structure 114p. Gas used for the PBII includes inert gas, $H_2$, $N_2$, $O_2$, F, and $Cl_2$. A plasma energy and the time for plasma treatment required for the PBII are, for example, −2 kV or above and 100 seconds or longer, respectively.

Referring to FIG. 1A and FIG. 1B, the neutral axis N1 in FIG. 1A may be adjusted to a neutral axis N2 in FIG. 1B due to the foregoing planarization process. The height of the neutral axis N2 varies less considerably compared to the height of the neutral axis N1, and therefore the failure of a flexible electronic device during the flexural process is avoided.

Figure 1C:
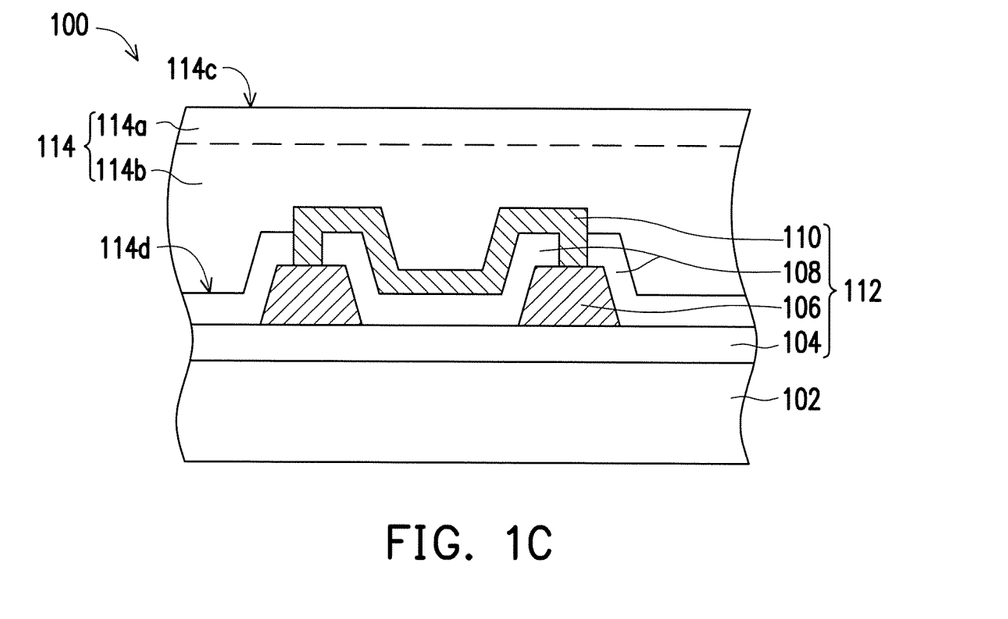

Referring to FIG. 1C, in the flexible electronic device 100, after the PBII is applied to the first barrier planarization structure 114p, a distribution, in which a concentration gradient of nitrogen atoms decreases gradually from top to bottom, is observed in the first barrier planarization structure 114p, and a first barrier planarization layer 114 is thereby formed.

In FIG. 1C, an upper surface of the first barrier planarization layer 114 is a planar first planarization surface 114c, and a lower surface of the first barrier planarization layer 114 is a first covering surface 114d covering the flexible substrate 102 and/or the device layer 112. In the first barrier planarization layer 114, a region near the first planarization surface 114c is a first nitrogen-rich region 114a. The concentration gradient of the nitrogen atoms results from the PBII, and the first nitrogen-rich region 114a has a higher concentration of nitrogen atoms. A material of the first nitrogen-rich region 114a is, for example, polysiloxazane.

Owing to the barrier characteristics of the material of the first nitrogen-rich region 114a in the first barrier planarization layer 114, a water vapor transmission rate of the first barrier planarization layer 114 is, for example, lower than or equal to $10^{-2}$ g/m$^2$-day or lower than or equal to $10^{-5}$ g/m$^2$-day preferably. The first barrier planarization layer 114 may at the same tune achieve the planarization effect and the barrier effect. In the first barrier planarization layer 114, a region near the first covering surface 114d is a first oxygen-rich region 114b. It is worth mentioning that a Young's modulus of the first barrier planarization layer 114 may be, for example, 3 Gpa to 10 Gpa, given that the flexible electronic device 100 is flexible.

Since the concentration gradient of the nitrogen atoms results from the PBII, the first oxygen-rich region 114b has a higher concentration of oxygen atoms. The first oxygen-rich region 114b may have better adhesion to, for example, the insulating layer 108 containing ester group.

Figure 2:
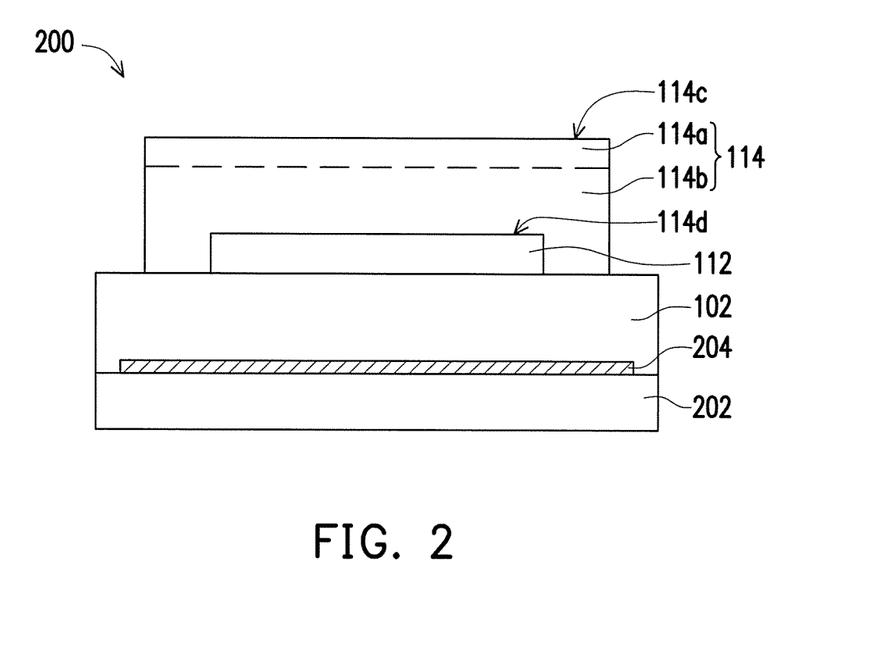

FIG. 2 is a cross-sectional view of a flexible electronic device according to another exemplary embodiment of the disclosure. Referring to FIG. 2, a flexible electronic device 200 includes the flexible substrate 102, the device layer 112, the first barrier planarization layer 114, a carrier 202, and a de-bonding layer 204. In FIG. 2, the flexible substrate 102 and the device layer 112 are presented in simplified forms so as to simplify identical or similar descriptions. Please refer to illustrations found in FIG. 1A to FIG. 1C for detailed structures of the flexible substrate 102 and the device layer 112.

The carrier 202 is disposed below the flexible substrate 102, and at least one de-bonding layer 204 is disposed between the carrier 202 and the flexible substrate 102. A lower surface of the flexible substrate 102 may be completely covered by the carrier 202. The first barrier planarization layer 114 is disposed above the flexible substrate 102 and the device layer 112, and the upper surface of the device layer 112 may be completely covered by the first covering surface 114d of the first barrier planarization layer 114. An embodiment provides that the first barrier planarization layer 114 may further extend to cover a side wall of the device layer 112 or even cover an exposed surface and/or a side wall of the flexible substrate 102.

The flexible substrate 102 and the device layer 112 are located between the first barrier planarization layer 114 and the carrier 202. The region of the first barrier planarization layer 114 near the first planarization surface 114c is the first nitrogen-rich region 114a. As described above, the first nitrogen-rich region 114a has good barrier characteristics, and the first barrier planarization layer 114 thus achieves the planarization effect and the barrier effect.

Figure 3:
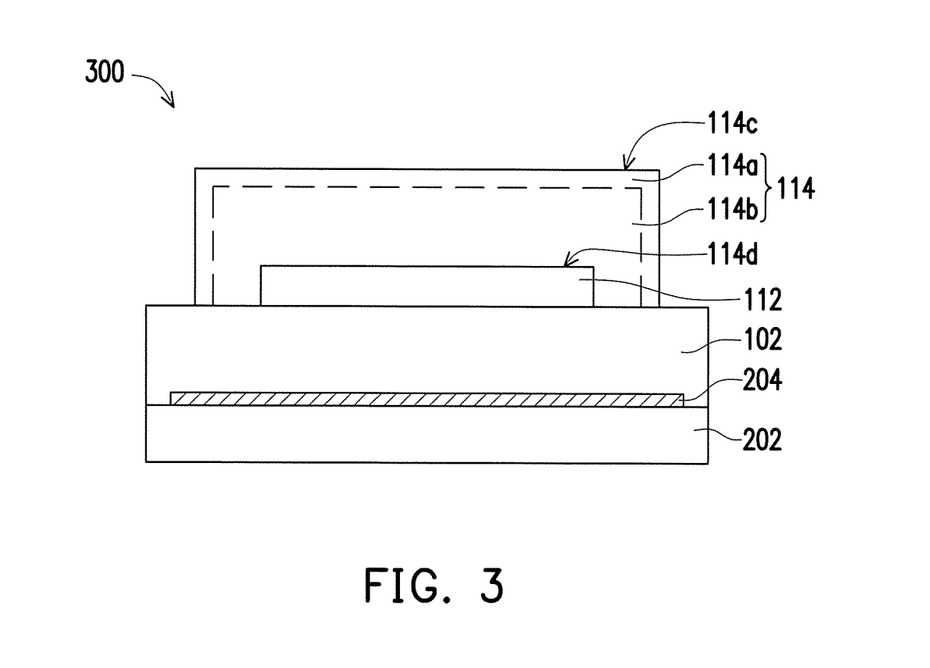

FIG. 3 is a cross-sectional view of a flexible electronic device according to another exemplary embodiment of the disclosure. The embodiment of a flexible electronic device 300 in FIG. 3 is similar to the embodiment of the flexible electronic device 200 in FIG. 2; therefore, identical elements are denoted by the same reference numerals, and details thereof will not be repeated hereinafter. In the flexible electronic device 300, the first nitrogen-rich region 114a of the first barrier planarization layer 114 is located in the region and a side wall of the first barrier planarization layer 114 near the first planarization surface 114c. The first nitrogen-rich region 114a in FIG. 3 is formed, for example, through the PBII applied on the first planarization surface 114c and the side wall of the first barrier planarization layer 114. In the first covering surface 114d of the first barrier planarization layer 114 provided in an embodiment, the first nitrogen-rich region 114a may cover the side wall of the device layer 112, or the first nitrogen-rich region 114a may further extend to cover the exposed surface and/or the side wall of the flexible substrate 102. The first oxygen-rich region 114b of the first barrier planarization layer 114, the flexible substrate 102, and the device layer 112 are encapsulated between the first nitrogen-rich region 114a of the first barrier planarization layer 114 and the carrier 202.

As mentioned above, the first nitrogen-rich region 114a achieves good barrier characteristics, and the first nitrogen-rich region 114a of the flexible electronic device 300 achieves better barrier effects at the side wall compared to the barrier effects achieved by the first nitrogen-rich region 114a of the flexible electronic device 200. The first barrier planarization layer 114 of the flexible electronic device 300 achieves the planarization effect and better barrier effect compared to those achieved by the first barrier planarization layer 114 of the flexible electronic device 200.

Figure 4:
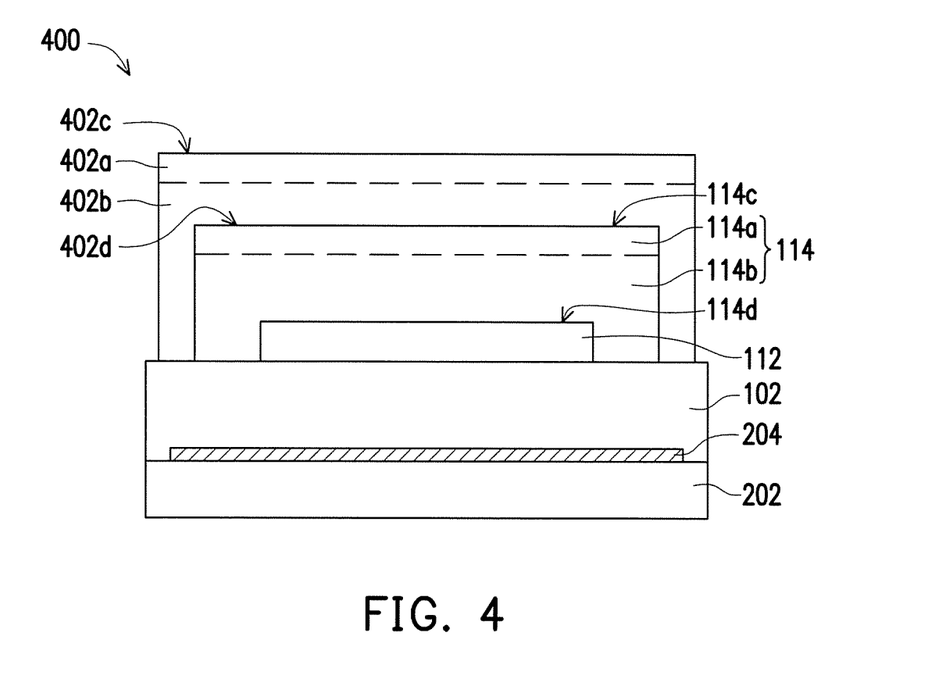

FIG. 4 is a cross-sectional view of a flexible electronic device according to another exemplary embodiment of the disclosure. The embodiment of a flexible electronic device 400 in FIG. 4 is similar to the embodiment of the flexible electronic device 200 in FIG. 2; therefore, identical elements are denoted by the same reference numerals, and details thereof will not be repeated hereinafter. The flexible electronic device 400 further includes a second barrier planarization layer 402. An upper surface of the second barrier planarization layer 402 is a planar second planarization surface 402c, and a lower surface of the second barrier planarization layer 402 includes the first planarization surface 114c in contact with the first barrier planarization layer 114 and a second covering surface 402d in contact with the device layer 112. A region near the first planarization surface 114c in the second barrier planarization layer 402 is a second nitrogen-rich region 402a. Similar to the first barrier planarization layer 114 whose concentration gradient of nitrogen atoms results from the PBII method, the second nitrogen-rich region 402a thereby has a higher concentration of nitrogen atoms, and a material of the second nitrogen-rich region 402a is, for example, polysiloxazane. The region near the second covering surface 402d in the second barrier planarization layer 402 is the second oxygen-rich region 402b. Similar to the first barrier planarization layer 114 whose concentration gradient of nitrogen atoms results from the PBII method, the second oxygen-rich region 402b thereby has a lower concentration of nitrogen atoms or has no nitrogen atoms. A material of the second oxygen-rich region 402b is, for example, polysiloxazane or polysiloxane, and the second oxygen-rich region 402b has a higher concentration of oxygen atoms.

Owing to the barrier characteristics of the material of the second nitrogen-rich region 402a in the second barrier planarization layer 402, a water vapor transmission rate of the second barrier planarization layer 402 is, for example, lower than or equal to $10^{-2}$ g/m$^2$-day, or lower than or equal to $10^{-5}$ g/m$^2$-day preferably. The second barrier planarization layer 402 and the first barrier planarization layer 114 may include identical materials and may be formed by the same manufacturing process.

As described above, the second nitrogen-rich region 402a and the first nitrogen-rich region 114a achieve good barrier characteristics, and the first barrier planarization layer 114 and the second barrier planarization layer 402 of the flexible electronic device 400 achieve the planarization effect as well as the barrier effect.

Figure 5:
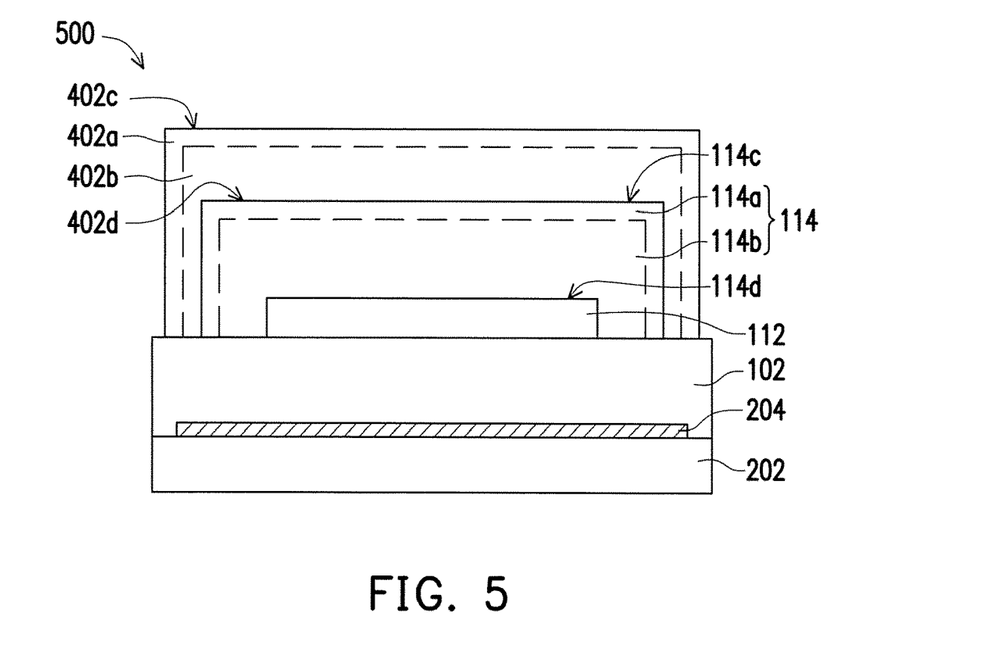

FIG. 5 is a cross-sectional view of a flexible electronic device according to another exemplary embodiment of the disclosure. Referring to FIG. 5, the embodiment of a flexible electronic device 500 in FIG. 5 is similar to the embodiment of the flexible electronic device 400 in FIG. 4; therefore, identical elements are denoted by the same reference numerals, and details thereof will not be repeated hereinafter. In the flexible electronic device 500, the first nitrogen-rich region 114a of the first barrier planarization layer 114 is located at the side wall of the first barrier planarization layer 114 and in a region of the first gas planarization layer 114 near the first planarization surface 114c. The second nitrogen-rich region 402a of the second barrier planarization layer 402 is located at a side wall of the second barrier planarization layer 402 and in a region of the second barrier planarization layer 402 near the second planarization surface 402c.

The first nitrogen-rich region 114a in FIG. 5 is formed, for example, through PBII applied on the first planarization surface 114c and the side wall of the first barrier planarization layer 114. An embodiment provides that in the first covering surface 114d of the first barrier planarization layer 114, the first nitrogen-rich region 114a may cover the side wall of the device layer 112, or the first nitrogen-rich region 114a may further extend to cover the exposed surface and/or the side wall of the flexible substrate 102. The first oxygen-rich region 114b of the first barrier planarization layer 114, the flexible substrate 102, and the device layer 112 are encapsulated between the first nitrogen-rich region 114a of the first barrier planarization layer 114 and the carrier 202. The second nitrogen-rich region 402a is formed, for example, through PBII applied on the second planarization surface 402c and the side wall of the second barrier planarization layer 402. An embodiment provides that in the second covering surface 402d of the second barrier planarization layer 402, the second nitrogen-rich region 402a may cover the side wall of the device layer 112, or the second nitrogen-rich region 402a may further extend to cover the exposed surface and/or the side wall of the flexible substrate 102. The second oxygen-rich region 402b of the second barrier planarization layer 402, the first barrier planarization layer 114, and the device layer 112 are encapsulated between the second nitrogen-rich region 402a of the second barrier planarization layer 402 and the carrier 202.

As mentioned above, the second nitrogen-rich region 402a and the first nitrogen-rich region 114a of the flexible electronic device 500 achieve good barrier characteristics and better barrier effects at the side wall compared to those achieved by the second nitrogen-rich region 402a and the first nitrogen-rich region 114a of the flexible electronic device 400. The first barrier planarization layer 114 and the second barrier planarization layer 402 of the flexible electronic device 500 achieve the planarization effect and better barrier effect compared to those achieved by the first barrier planarization layer 114 and the second barrier planarization layer 402 of the flexible electronic device 400.

Figure 6:
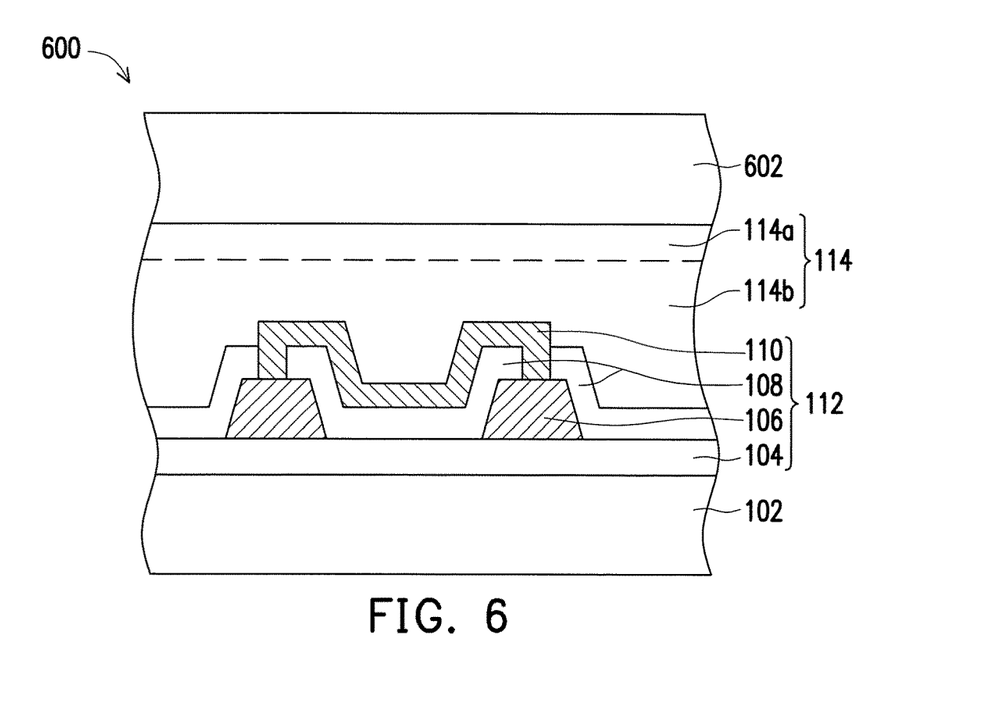

FIG. 6 is a cross-sectional view of a flexible electronic device according to another exemplary embodiment of the disclosure. Referring to FIG. 6, the embodiment of a flexible electronic device 600 in FIG. 6 is similar to the embodiment of the flexible electronic device 100 in FIG. 1C; therefore, identical elements are denoted by the same reference numerals, and details thereof will not be repeated hereinafter. The flexible electronic device 600 further includes an adhesion layer 602 above the first planarization surface 114c of the first barrier planarization layer 114. The first nitrogen-rich region 114a may have better adhesion to, for example, the adhesion layer 602 containing epoxy group, and the adhesion layer 602 may include a material containing epoxy group. Alternately, although it is not shown in FIG. 6, it should be understood that the adhesion layer 602 may also be disposed above the second planarization surface 402c of the second barrier planarization layer 402 to achieve the foregoing effects.

Figure 7:
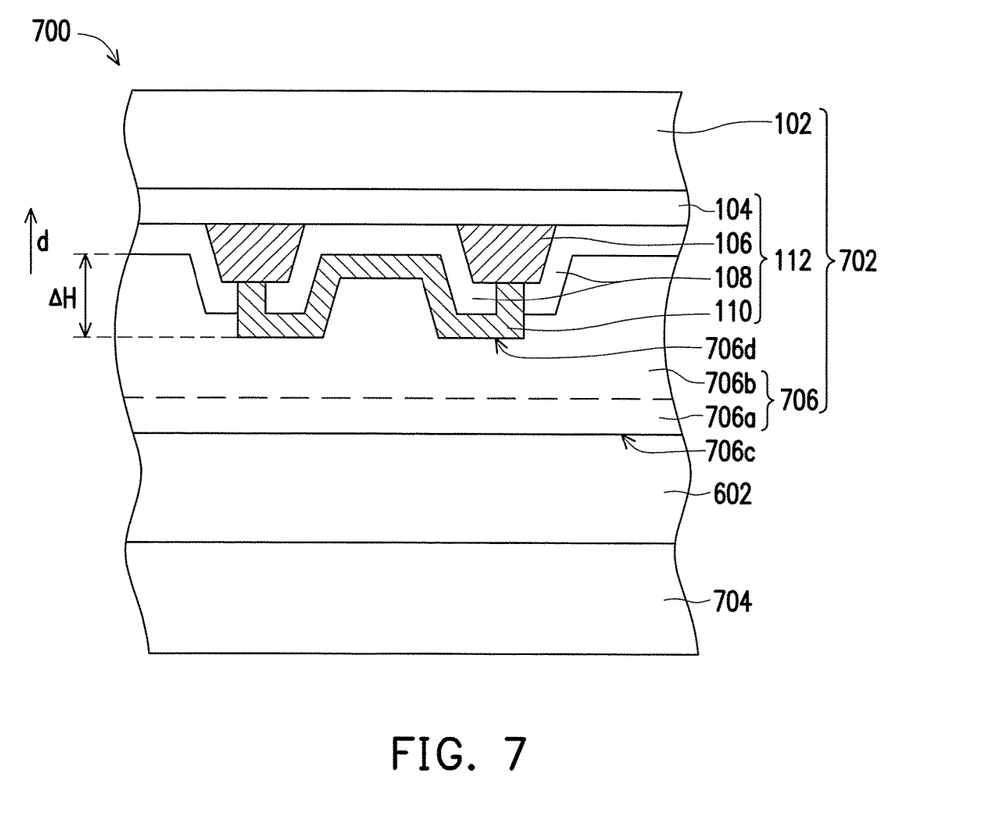

FIG. 7 is a cross-sectional view of a flexible electronic device according to another exemplary embodiment of the disclosure. FIG. 7 illustrates one way to implement and apply the disclosure to a touch panel and a display panel to better explain a structure of a flexible electronic device 700, but the disclosure is not limited thereto. Besides, in a process of manufacturing the flexible electronic device 700 illustrated in FIG. 7, the device and the film layers may be placed upside down, and directional terms, such as "above," "below," "upper surface," and "lower surface" are explained correspondingly with reference to the figures.

Referring to FIG. 7, the flexible electronic device 700 includes a first panel 702, the adhesion layer 602, and a second panel 704. The first panel 702 and the second panel 704 may be a touch panel and a display panel, respectively. The first panel 702 includes the flexible substrate 102, the device layer 112, and the barrier planarization layer 706. The device layer 112 is a film layer of the touch panel which includes the buffer layer 104, the conductive layer 106, the insulating layer 108, and the metal layer 110, for instance. The structures, materials, and manufacturing methods of the flexible substrate 102 and the device layer 112 may be derived from the foregoing descriptions, and identical or similar content will not be repeated below.

As shown in FIG. 7 and at the same time referring to FIG. 1A, the flexible substrate 102 and the device layer 112 have a nonplanar film stacking design. An imaginary connecting line (or named as a neutral axis) of the flexible electronic device 700 with an internal stress of 0 in the film stacking direction d shows varying heights. A height $\bar{y}$ of the neutral axis of the flexible electronic device 700 at a specific position in the film stacking direction d may be represented as (Equation 1):

$$\bar{y} = \frac{\sum L_i \cdot W_i \cdot H_i}{\sum L_i \cdot W_i} \quad \text{(Equation 1)}$$

$L_i$ represents a length of an equivalent structure of an i-th film layer at the specific position corresponding to a Young's modulus, $W_i$ represents a thickness of the i-th film layer at the specific position, and $H_i$ represents a height of the i-th film layer at the specific position at a center point in the film stacking direction.

According to a calculation result (of the Equation 1), it can be seen that at the specific position where a pattern layer is disposed, the thickness of the stacked films is greater, and the height $\bar{y}$ of the neutral axis is also greater. On the contrary, at the specific position where no pattern layer is disposed, the thickness of the stacked films is thinner, and the height $\bar{y}$ of the neutral axis is lower. In other words, before the flexible electronic device 700 is planarized, differences of the height $\bar{y}$ of the neutral axis of the flexible electronic device 700 are considerable. If the differences of the height $\bar{y}$ in parts of the neutral axis are overly large, the flexible electronic device 700 may experience a failure more easily during a flexural process, for example, a failure of electric properties or a failure of physical characteristics (e.g., barrier effects). Nevertheless, when a barrier planarization layer 706 is formed on the flexible substrate 102 and the device layer 112, the planarization leads to the reduction of the differences of the height $\bar{y}$ in parts of the neutral axis.

If the Young's modulus of the barrier planarization layer 706 and the Young's modulus of the pattern layer are closer to each other, it is easier to adjust the neutral axis. Nevertheless, if the flexible electronic device 700 is to be equipped with flexibility, the Young's modulus of the barrier planarization layer 706 may be, for example, 3 Gpa to 10 Gpa.

The manufacturing process of the first panel 702 of the flexible electronic device 700 may be derived from FIG. 1A to FIG. 1C and FIG. 6, and the following description about directions is provided on the basis of FIG. 1A to FIG. 1C and FIG. 6.

Referring to FIG. 7 and at the same time referring to FIG. 1B, after the flexible substrate 102 and the device layer 112 are formed, a material used to form the barrier planarization layer 706 on the flexible substrate 102 and the device layer 112 through solution coating, for example, includes polysilazane, polysiloxane, polysiloxazane, or other suitable materials capable of accomplishing good planarization effects. The upper surface of the flexible substrate 102 and/or the upper surface of the device layer 112 may be completely covered during a process of forming a film layer of the barrier planarization layer 706. The upper surface of the device layer 112 along the film stacking direction d has the maximum height difference ΔH, for example, less than or equal to 900 nm, less than or equal to 600 nm preferably, or less than or equal to 300 nm more preferably. After the solution-coated barrier planarization layer 706 is solidified, the PBII is applied to the barrier planarization layer 706, and the nitrogen atoms are implanted into the barrier planarization layer 706 to enhance the barrier effect of the barrier planarization layer 706.

Referring to FIG. 7 and at the same time referring to FIG. 1C, in the flexible electronic device 700, after PBII is applied to the barrier planarization layer 706, a concentration gradient of nitrogen atoms in the barrier planarization layer 706 decreases gradually from top to bottom. An upper surface of the barrier planarization layer 706 is a planarization surface 706c, and a lower surface of the barrier planarization layer 706 is a covering surface 706d covering the flexible substrate 102 and/or the device layer 112. In the barrier planarization layer 706, a region near the planarization surface 706c is a nitrogen-rich region 706a.

The concentration gradient of the nitrogen atoms may result from the PBII, the nitrogen-rich region 706a has a higher concentration of nitrogen atoms, and a material of the nitrogen-rich region 706a is, for example, polysiloxazane. Owing to the barrier characteristics of the material of the nitrogen-rich region 706a in the barrier planarization layer 706, a water vapor transmission rate of the barrier planarization layer 706 is, for example, lower than or equal to $10^{-2}$ g/m$^2$-day or lower than or equal to $10^{-5}$ g/m$^2$-day preferably. The barrier planarization layer 706 may at the same time achieve the planarization effect and the barrier effect. In the barrier planarization layer 706, a region near the covering surface 706d is an oxygen-rich region 706b. The concentration gradient of the nitrogen atoms may result from the PBII, and the oxygen-rich region 706b has a lower concentration of nitrogen atoms or has no nitrogen atoms. A material of the oxygen-rich region 706b is, for example, polysiloxazane or polysiloxane, and the oxygen-rich region 706b has a higher concentration of oxygen atoms. The oxygen-rich region 706b may have better adhesion to the insulating layer 108 containing ester group or to the metal layer 110, and the insulating layer 108 may include a material containing ester group.

Referring to FIG. 7 and at the same time referring to FIG. 6, the flexible electronic device 700 includes an adhesion layer 602 disposed above the planarization surface 706c of the barrier planarization layer 706. The nitrogen-rich region 706a may have better adhesion to, for example, the adhesion layer 602 containing epoxy group, and the adhesion layer 602 may include a material containing epoxy group.

As shown in FIG. 7, the flexible electronic device 700 may be placed upside down after going through the foregoing process. The adhesion layer 602 of the flexible electronic device 700 is adhered to the other surface of the barrier planarization layer 706 and the second panel 704, such that the first panel 702 and the second panel 704 of the flexible electronic device 700 are adhered to each other through the adhesion layer 602.

The embodiments of the disclosure provide the flexible electronic device having the barrier planarization layer, and the barrier planarization layer has the oxygen-rich region capable of performing the barrier function. The barrier planarization layer provided in the embodiments of the disclosure may improve the barrier function performed. Furthermore, the barrier and planarization effects may be achieved through deposition of one single film layer.

In addition, the nitrogen-rich region of the barrier planarization layer has better adhesion to the adhesion layer containing epoxy group, and the oxygen-rich region of the barrier planarization layer may have better adhesion to the insulating layer containing ester group and or to the metal layer. The barrier planarization layer provided by the embodiments of the disclosure is thus able to ensure the reliability of the device structure.

It will be clear that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A flexible electronic device, comprising:
a flexible substrate;
a device layer, located on the flexible substrate and having an upper surface, wherein a maximum height difference measured between highest and lowest points of the upper surface in a film stacking direction is less than or equal to 900 nm; and
a first barrier planarization layer, covering the device layer and the flexible substrate, the first barrier planarization layer having a first covering surface and a first planarization surface opposite to the first covering surface, wherein the first barrier planarization layer has a water vapor transmission rate lower than or equal to $10^{-2}$ g/m$^2$-day;
wherein the first barrier planarization layer has a first oxygen-rich region and a first nitrogen-rich region, the first oxygen-rich region is adjacent to the first covering surface of the first barrier planarization layer, and the first nitrogen-rich region is adjacent to the first planarization surface of the first barrier planarization layer, and the first nitrogen-rich region is processed differently than the first oxygen-rich region to have a higher concentration of nitrogen atoms than the first oxygen-rich region.

2. The flexible electronic device as claimed in claim 1, further comprising:
a carrier; and
a de-bonding layer, located between the flexible substrate and the carrier,
wherein the flexible substrate and the device layer are located on the carrier, and the first barrier planarization layer covers the upper surface and/or a side wall of the device layer and covers the carrier, and the device layer is located between the first barrier planarization layer and the carrier.

3. The flexible electronic device as claimed in claim 2, wherein the first nitrogen-rich region further comprises a side wall of the first barrier planarization layer.

4. The flexible electronic device as claimed in claim 2, further comprising:
a second barrier planarization layer, covering the first barrier planarization layer and having a second covering surface and a second planarization surface opposite to the second covering surface, the second barrier planarization layer having a second oxygen-rich region and a second nitrogen-rich region, the second oxygen-rich region being adjacent to the second covering surface of the second barrier planarization layer, and the second nitrogen-rich region being adjacent to the second planarization surface of the second barrier planarization layer, wherein the second barrier planarization layer has a water vapor transmission rate lower than or equal to $10^{-2}$ g/m$^2$-day.

5. The flexible electronic device as claimed in claim 4, wherein the second barrier planarization layer covers the upper surface and the side wall of the device layer, the first planarization surface and the side wall of the first barrier planarization layer, and the carrier, and the device layer and the first barrier planarization layer are encapsulated between the second barrier planarization layer and the carrier.

6. The flexible electronic device as claimed in claim 5, wherein the second nitrogen-rich region further comprises a side wall of the second barrier planarization layer.

7. The flexible electronic device as claimed in claim 1, further comprising:
an adhesion layer, located on the first planarization surface of the first barrier planarization layer.

8. The flexible electronic device as claimed in claim 7, wherein:
a material of the adhesion layer comprises epoxy material,
a material of the first nitrogen-rich region of the first barrier planarization layer comprises polysiloxazane, and the first nitrogen-rich region of the first barrier planarization layer is in contact with the adhesion layer,
the device layer has an insulating layer, and a material of the insulating layer comprises ester material, and
a material of the first oxygen-rich region of the first barrier planarization layer comprises polysiloxazane or polysiloxane, and the first oxygen-rich region of the first barrier planarization layer is in contact with the insulating layer.

9. The flexible electronic device as claimed in claim 1, wherein a Young's modulus of the first barrier planarization layer falls between 3 Gpa to 10 Gpa.

10. A flexible electronic device, comprising:
a first panel, comprising:
a flexible substrate;
a device layer, located on the flexible substrate; and
a barrier planarization layer, covering the device layer and the flexible substrate and having a covering surface and a planarization surface opposite to the covering surface, the barrier planarization layer having an oxygen-rich region and a nitrogen-rich region, the oxygen-rich region being adjacent to the covering surface of the barrier planarization layer, the nitrogen-rich region being adjacent to the planarization surface of the barrier planarization layer, and the nitrogen-rich region is processed differently than the oxygen-rich region to have a higher concentration of nitrogen atoms than the oxygen-rich region;
a second panel; and
an adhesion layer, disposed between the first panel and the second panel, the adhesion layer being in contact with the planarization surface of the barrier planarization layer and the second panel.

11. The flexible electronic device as claimed in claim 10, wherein
a material of the adhesion layer comprises epoxy material,
a material of the nitrogen-rich region of the barrier planarization layer comprises polysiloxazane,
the device layer has an insulating layer, and a material of the insulating layer comprises ester material, and
a material of the oxygen-rich region of the barrier planarization layer comprises polysiloxazane or polysiloxane, and the oxygen-rich region of the barrier planarization layer is in contact with the insulating layer.

12. The flexible electronic device as claimed in claim 10, wherein the device layer has an upper surface, and a maximum height difference measured between highest and lowest points of the upper surface in a film stacking direction is less than or equal to 900 nm.

13. The flexible electronic device as claimed in claim 10, wherein the barrier planarization layer has a water vapor transmission rate lower than or equal to $10^{-2}$ g/m$^2$-day.

14. The flexible electronic device as claimed in claim 10, wherein a Young's modulus of the barrier planarization layer falls between 3 Gpa to 10 Gpa.

15. The flexible electronic device as claimed in claim 10, wherein the first panel is a touch panel, and the second panel is a display panel.

* * * * *